US006602324B2

(12) United States Patent
Stein et al.

(10) Patent No.: US 6,602,324 B2
(45) Date of Patent: Aug. 5, 2003

(54) SULFUR CONTROL IN ION-CONDUCTING MEMBRANE SYSTEMS

(75) Inventors: VanEric Edward Stein, Allentown, PA (US); Robin Edward Richards, Lansdale, PA (US); David Douglas Brengel, Schnecksville, PA (US); Michael Francis Carolan, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/015,892

(22) Filed: Nov. 15, 2001

(65) Prior Publication Data

US 2003/0089229 A1 May 15, 2003

(51) Int. Cl.[7] .................. B01D 53/22; B01D 53/14; B01D 53/50
(52) U.S. Cl. .................. 95/54; 95/137; 95/235; 423/242.7
(58) Field of Search ............. 95/54, 137, 235; 96/4, 7–10; 423/242.7

(56) References Cited

U.S. PATENT DOCUMENTS

| 5,118,395 | A | * | 6/1992 | Chen et al. ............. 95/54 X |
| 5,392,594 | A | | 2/1995 | Moore et al. ........... 60/39.02 |
| 5,516,359 | A | | 5/1996 | Kang et al. ............. 95/14 |
| 5,562,754 | A | * | 10/1996 | Kang et al. ............. 95/54 |
| 5,657,624 | A | | 8/1997 | Kang et al. ............ 60/39.02 |
| 5,753,007 | A | * | 5/1998 | Russek et al. ........... 95/54 X |
| 5,865,878 | A | | 2/1999 | Drnevich et al. ......... 95/54 |
| 5,944,874 | A | | 8/1999 | Prasad et al. ........... 95/54 |
| 5,964,922 | A | * | 10/1999 | Keskar et al. .......... 95/54 X |
| 6,056,807 | A | | 5/2000 | Carolan et al. ........... 96/4 |
| 6,139,604 | A | | 10/2000 | Gottzmann et al. ....... 95/54 |
| 6,293,997 | B1 | * | 9/2001 | Verbockhaven et al. .... 95/54 |

FOREIGN PATENT DOCUMENTS

EP        0931763       7/1999

OTHER PUBLICATIONS

Prasad et al. "OTM–A Novel Technology for Integrated Oxygen Production in IGCC", presented at the 17th International Pittsburgh Coal Conference, Sep. 12, 2000, p. 11.
Gardner, Jerry, "Cogeneration (Hydrogen & Electrical Power) Using the Texaco Gasification Power Systems (TGPS) Technology", Presented at the 1994 AFTP Conference, Jun. 28, 1994, Paris, France.

* cited by examiner

Primary Examiner—Robert H. Spitzer
(74) Attorney, Agent, or Firm—John M. Fernbacher (57) ABSTRACT

A method for controlling the sulfur dioxide partial pressure in a pressurized, heated, oxygen-containing gas mixture which is contacted with an ion-conducting metallic oxide membrane which permeates oxygen ions. The sulfur dioxide partial pressure in the oxygen-depleted non-permeate gas from the membrane module is maintained below a critical sulfur dioxide partial pressure, $p_{SO2}{}^*$, to protect the membrane material from reacting with sulfur dioxide and reducing the oxygen flux of the membrane. Each ion-conducting metallic oxide material has a characteristic critical sulfur dioxide partial pressure which is useful in determining the required level of sulfur removal from the feed gas and/or from the fuel gas used in a direct-fired feed gas heater.

28 Claims, 3 Drawing Sheets

SULFUR CONTROL IN ION-CONDUCTING MEMBRANE SYSTEMS

STATEMENT REGARDING FEDERALLY SPONSORED RESEARCH OR DEVELOPMENT

This invention was made with government support under Contract No. DE-FC26-98FT40343 between Air Products and Chemicals, Inc. and the U.S. Department of Energy. The Government has certain rights to this invention.

BACKGROUND OF THE INVENTION

The recovery of oxygen from air and other oxygen-containing gas mixtures by solid ion-conducting metallic oxide membranes is a rapidly-developing technology with the potential for significant reduction in the cost and energy requirements of oxygen production. Many useful metallic solid oxide materials have been identified in the art which effectively recover oxygen at temperatures in a typical range of 750° C. to 950° C. Numerous industrial applications which recover oxygen from air are envisioned in which high temperature ion-conducting metallic oxide membrane systems are integrated with gas turbines to enhance the overall energy efficiency of oxygen recovery. In such applications, preheating of the compressed air feed to the membrane system can be accomplished by direct combustion of the compressed air with fuel gas wherein the combustion products pass directly into the membrane modules. Hot, oxygen-depleted, non-permeate gas from the membrane system is expanded through the gas turbine expander to recover useful work.

Solid ion-conducting metallic oxide materials may degrade in the presence of sulfur dioxide at the high operating temperatures required to effect ion conduction, thereby reducing their capacity to conduct or permeate oxygen ions through membranes fabricated from these materials. Because of this problem, the successful operation of ion-conducting metallic oxide membrane systems may require control of sulfur dioxide in the membrane feed gas.

The heat requirements for operating ion-conducting metallic oxide membrane systems typically are provided by the combustion of fuel gas with pressurized ambient air wherein the hot combustion gases provide feed directly to the membrane system. Various types of fuel gases, including natural gas, synthesis gas, and other combustible A gases, contain reduced sulfur compounds such as hydrogen sulfide, carbonyl sulfide, mercaptans, and the like. These sulfur compounds will form sulfur dioxide when the fuel gas is combusted, thereby contributing to the exposure of membrane materials to sulfur dioxide. In addition, ambient air contains sulfur dioxide, and this also will contribute to the sulfur dioxide level to which the membranes are exposed.

The strategy and treatment methods for protecting ion-conducting metallic oxide membrane systems from potentially damaging sulfur dioxide will depend upon several factors, the most important of which are the concentration of reduced sulfur compounds in the fuel gas, the concentration of sulfur dioxide in the ambient air, the operating conditions of the membrane system, and the reactivity of the membrane material with sulfur dioxide. The invention described below and defined by the claims which follow offers a strategy for selecting effective methods to control the sulfur dioxide concentration in the heated feed gas to ion-conducting metallic oxide membrane systems at acceptable levels.

BRIEF SUMMARY OF THE INVENTION

The invention relates to a method for the operation of an ion-conducting membrane system including at least one ion-conducting metallic oxide membrane which divides the system into a feed side and a permeate side, each side having an inlet and an outlet, wherein the method comprises providing a pressurized, heated, oxygen-containing gas mixture which also contains sulfur dioxide, introducing the compressed, heated, oxygen-containing gas mixture into the feed side of the membrane system, transporting oxygen ions through the ion-conducting membrane, withdrawing a hot, oxygen-depleted, non-permeate gas from the outlet of the feed side of the zone, and maintaining the sulfur dioxide partial pressure in the hot, oxygen-depleted, non-permeate gas mixture at the outlet of the feed side at a value below a critical sulfur dioxide partial pressure, $p_{SO2}{}^*$, which is defined as the sulfur dioxide partial pressure above which sulfur dioxide reacts with the ion-conducting metallic oxide membrane to reduce oxygen flux through the membrane material and below which sulfur dioxide does not react with the ion-conducting metallic oxide membrane to reduce oxygen flux through the membrane material. The value of $p_{SO2}{}^*$ preferably is defined at the temperature of the hot, oxygen-depleted, non-permeate gas at the outlet of the feed side of the zone.

The oxygen-containing gas mixture may be atmospheric air, and the sulfur dioxide partial pressure in the atmospheric air may be defined as the annual maximum, three-hour, time-weighted average sulfur dioxide partial pressure.

The ion-conducting membrane may contain a multicomponent metallic oxide which comprises strontium. The ion-conducting membrane may comprise a multicomponent metal oxide of the general formula $(Ln_{1-x}A_x)_w(B_{1-y}B'_y)O_{3-d}$, wherein Ln represents one or more elements selected from the group consisting of La, the D block lanthanides of the IUPAC periodic table, and Y; wherein A represents one or more elements selected from the group consisting of Mg, Ca, Sr and Ba; wherein B and B' each represent one or more elements selected from the group consisting of Sc, Ti, V, Cr, Mn, Fe, Co, Ni, Cu, Al, Zr and Ga; wherein $0 \leq x \leq 1$, $0 \leq y1$, and $0.95 < w < 1.05$; and wherein d is a number that renders the compound charge neutral.

The membrane system may be operated at an average temperature between about 750° C. and about 950° C. Typically, the value of $p_{SO2}{}^*$ may be in the range of about $10^{-4}$ to about $10^{-7}$ atma.

The invention also relates to a method for the recovery of oxygen from an oxygen-containing gas mixture which also contains sulfur dioxide, which method comprises:

(a) compressing the oxygen-containing gas mixture to provide a compressed, oxygen-containing gas;

(b) heating at least a portion of the compressed, oxygen-containing gas to provide a heated and compressed oxygen-containing gas;

(c) introducing the heated and compressed oxygen-containing gas into a membrane separation zone comprising at least one ion-conducting membrane which divides the zone into a feed side and a permeate side, each side having an inlet and an outlet, withdrawing a hot, oxygen-depleted, non-permeate gas from the outlet of the feed side of the zone, and withdrawing an oxygen permeate product from the permeate side of the zone; and (d) maintaining the sulfur dioxide partial pressure in the hot, oxygen-depleted, non-permeate gas at the outlet of the feed side at a value below a critical sulfur dioxide partial pressure, $p_{SO2}{}^*$.

The critical sulfur dioxide partial pressure, $p_{SO2}{}^*$, is defined as the sulfur dioxide partial pressure above which sulfur dioxide reacts with the at least one ion-conducting membrane to reduce oxygen flux through the membrane material and below which sulfur dioxide does not react with the at least one ion-conducting membrane to reduce oxygen flux through the membrane material. The value of $p_{SO2}^*$ preferably is defined at the temperature of the hot, oxygen-depleted, non-permeate gas mixture at the outlet of the feed side.

The heating of at least a portion of the compressed, oxygen-containing gas may be effected by combustion of the compressed, oxygen-containing gas with a fuel gas in a direct-fired burner such that the combustion products from the burner provide the heated and compressed oxygen-containing gas, and wherein one or more sulfur-containing compounds are removed from one or more gas streams selected from the group consisting of the oxygen-containing gas mixture, the compressed oxygen-containing gas, the heated and compressed oxygen-containing gas, and the fuel gas.

In this method, the value of $p_{SO2}^*$ may be defined by the equation $$p_{SO2}^* > PR[10^{-9}Y_{SO2(a)} + 10^{-6}Y_{SO2e(f)}/AFR]/[1-F_{O2}]$$

where PR is the pressure ratio of the feed gas compressor, AFR is the air to fuel ratio in the direct-fired burner, $Y_{SO2(a)}$ is the concentration of sulfur dioxide expressed as parts per billion by volume (ppb) in the oxygen-containing gas mixture, $Y_{SO2e(f)}$ is the equivalent concentration of sulfur dioxide expressed as parts per million by volume (ppm) in the fuel gas, and $F_{O2}$ is the fraction of the oxygen-containing gas to the membrane separation zone that is removed as oxygen by permeation through the at least one ion-conducting membrane.

The oxygen-containing gas mixture may be atmospheric air. The ion-conducting membrane may contain a multicomponent metallic oxide which comprises strontium.

At least a portion of the sulfur dioxide may be removed from the oxygen-containing gas mixture, the compressed, oxygen-containing gas, and/or the heated and compressed oxygen-containing gas. The fuel gas may contain one or more sulfur-containing compounds and at least a portion of the sulfur-containing compounds may be removed from the fuel gas prior to the direct-fired burner.

The compressed, oxygen-containing gas may be preheated by indirect heat exchange with the hot, oxygen-depleted, non-permeate gas prior to heating in the direct-fired burner. At least a portion of the sulfur dioxide may be removed from the oxygen-containing gas prior to being preheated by indirect heat exchange with the hot, oxygen-depleted, non-permeate gas.

At least a portion of the sulfur dioxide may be removed from the oxygen-containing gas after being preheated by indirect heat exchange with the hot, oxygen-depleted, non-permeate gas. At least a portion of the sulfur dioxide may be removed from this oxygen-containing gas after being preheated by indirect heat exchange with the hot, oxygen-depleted, non-permeate gas by contacting the oxygen-containing gas with a solid ion-conducting material that has a $p_{SO2}^*$ which is less than the $p_{SO2}^*$ of the oxygen-selective, ion-conducting membrane of (c).

The oxygen-depleted, non-permeate gas may be heated in a direct-fired combustor to provide a heated, oxygen-depleted, non-permeate gas, wherein the heated, oxygen-depleted, non-permeate gas is expanded in an expansion turbine to generate shaft work. At least a portion of the sulfur dioxide may be removed from the oxygen-containing gas after being preheated by indirect heat exchange with the hot, oxygen-depleted, non-permeate gas by contacting the oxygen-containing gas with a solid ion-conducting material which has a $p_{SO2}^*$ which is less than the $p_{SO2}^*$ of the oxygen-selective, ion-conducting membrane of (c). At least a portion of the shaft work of the expansion turbine may be utilized to compress the oxygen-containing gas mixture of (a).

If desired, a portion of the compressed, oxygen-containing gas may be withdrawn and combined with the oxygen-depleted, non-permeate gas prior to the direct-fired combustor. A supplemental stream of an oxygen-containing gas mixture that also contains sulfur dioxide may be compressed to yield a supplemental compressed oxygen-containing gas mixture which is added to the compressed oxygen-containing gas after withdrawal of the portion of the compressed, oxygen-containing gas.

At least a portion of the sulfur dioxide may be removed from the supplemental stream of the oxygen-containing gas mixture or the supplemental compressed oxygen-containing gas mixture. The direct-fired combustor may utilize a treated fuel gas obtained by removing one or more sulfur-containing compounds from a raw fuel gas. The fuel gas for the direct-fired burner may be provided by further treating a portion of the treated fuel gas to remove additional sulfur-containing compounds therefrom.

DETAILED DESCRIPTION OF THE INVENTION

The present invention relates to a method for the operation of solid ion-conducting metallic oxide membrane systems. These systems may be utilized for oxygen recovery wherein an oxygen partial pressure differential or a voltage differential across a membrane causes oxygen ions to migrate through the membrane from the feed side to the permeate side, where the ions recombine to form electrons and oxygen gas. An ion-conducting membrane of the pressure-driven type is defined herein as a mixed conductor membrane, in which the electrons and oxygen ions simultaneously migrate through the membrane and preserve internal electrical neutrality. An ion-conducting membrane of the electrically-driven type is defined herein as a solid electrolyte membrane in which the electrons flow from the permeate side to the feed side of the membrane in an external circuit driven by a voltage differential. These systems may be used, for example, in the direct recovery of a high purity oxygen product from oxygen-containing gas mixtures such as air.

Alternatively, ion-conducting membrane systems may be used as reactor systems for the production of oxidation products or partial oxidation products from carbonaceous feed gas. In this application, oxygen reacts with a carbonaceous feed gas on the permeate side of the membrane to form the oxidation or partial oxidation products. The carbonaceous feed gas may be, for example, a methane-containing feed gas such as natural gas and the partial oxidation product may be, for example, synthesis gas containing hydrogen and carbon monoxide.

The term "ion-conducting" as used herein includes both solid electrolyte and mixed conductor membranes utilized for oxygen recovery as well as membranes utilized in membrane reactors for the production of oxidation products or partial oxidation products from carbonaceous feeds. The invention described below may be applied to any of the ion-conducting membrane materials utilized in these applications.

The generic term "oxygen" as used here may include oxygen ions, which are transported through the ion-conducting metallic oxide membrane, and gaseous oxygen or $O_2$, which is supplied in the oxygen-containing feed gas to the membrane system and which is withdrawn from the permeate side of the membrane system as an oxygen product. It also includes oxygen which reacts with hydrocarbons on the permeate side of an ion-conducting metallic oxide membrane reactor system to yield oxidation products.

A common feature of these applications of solid ion-conducting metallic oxide membrane systems is the introduction of a pressurized, heated, oxygen-containing gas such as air into the feed side of the membrane system wherein oxygen ions are transported through the metallic oxide membrane and a hot, oxygen-depleted, non-permeate gas is withdrawn from the system. A common problem in the operation of these solid ion-conducting metallic oxide membrane systems is that the oxygen-containing gas, which in many applications is air, may contain sulfur dioxide. In addition, when direct-fired burners are used to heat the oxygen-containing gas, the fuel gas may contain sulfur compounds which form sulfur dioxide in the combustion process.

Sulfur dioxide can react with ion-conducting metallic oxide membrane materials to form certain sulfur-containing compounds which may reduce the flux of oxygen ions through the membrane. The impact of sulfur dioxide on an ion-conducting membrane material depends on at least two parameters—the partial pressure of sulfur dioxide, $p_{SO2}$, in the oxygen-containing stream which contacts the membrane and the reactivity of sulfur dioxide with the membrane material at the membrane operating temperature. It was found in the development of the present invention that the reactivity of sulfur dioxide with ion-conducting metallic oxide membranes varies with the membrane material composition and temperature. Further, it was found that each membrane material composition has a critical sulfur dioxide partial pressure, $p_{SO2}^*$, which is defined as the sulfur dioxide partial pressure above which sulfur dioxide reacts with the ion-conducting membrane material to reduce the oxygen flux through the membrane material and below which sulfur dioxide does not react with the ion-conducting membrane material to reduce the oxygen flux through the membrane material. The partial pressure of sulfur dioxide, $p_{SO2}$, in the oxygen-containing gas stream which contacts the membrane material must be maintained at a value below $p_{SO2}^*$ to eliminate adverse affects on the membrane performance.

An initial experiment was conducted to quantify how sulfur dioxide in the oxygen-containing feed gas to an ion-conducting membrane can reduce the oxygen flux through the membrane. Multicomponent metal oxides having the composition $La_{0.2}Sr_{0.8}Co_{0.41}Fe_{0.41}Cu_{0.2}O_{3-d}$ were prepared, wherein d is a number that renders the compound charge neutral. A powder preparation technique was used in which 1.95 parts by weight $La_2O_3$, 7.07 parts by weight $SrCO_3$, 1.84 parts by weight CoO, 1.96 parts by weight $Fe_2O_3$ and 1 part by weight CuO were ball milled together for 12 hours. The mixture then was fired in air at 1000° C. for 24 hours followed by cooling to room temperature. The mixture then was ground by ball milling and refired in air at 1000° C. for 24 hours followed by cooling to room temperature. The material possessed a perovskite crystal structure as determined by x-ray diffraction. The powder then was air milled to 1–5 micrometers average particle size.

The multicomponent metal oxide was combined with a plasticizer, binder and toluene solvent to form a slip suitable for tape casting. The slip was cast into a tape and dried using standard methods. Disk-shaped membranes were cut from the tape using standard methods. The disks were fired in air in a controlled manner to remove the plasticizer, binder and solvent and to sinter the tape into a dense membrane.

The oxygen transport performance of the membrane in the presence of sulfur dioxide was examined in the following experiment. The experiment was initiated by heating the membrane to 850° C. and passing air over the first surface of the membrane and helium over the second surface of the membrane. Oxygen was transported through the membrane from the feed side to the permeate side as oxygen ions, which combined to form oxygen gas which mixed with the helium sweep gas. The amount of oxygen in the helium/oxygen mixture was analyzed using an oxygen analyzer to determine the oxygen transport rate.

Figure 1A:
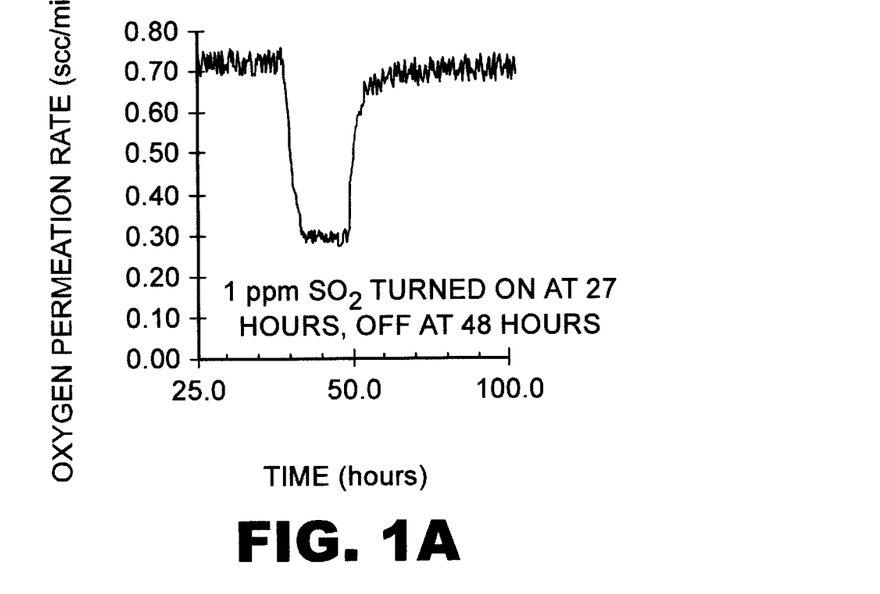
FIG. 1A is a plot of oxygen permeation rate for an ion-conducting metallic oxide membrane which is exposed to sulfur dioxide in the feed gas for a selected time period.

The feed to the first surface of the membrane was maintained as pure air for 27 hours. At that point, the feed to the membrane was switched to a mixture of 1 ppm $SO_2$ in air. Two hours after the introduction of $SO_2$, the flux began to decrease. By 30 hours, the flux had fallen to 25% of the original value. After 48 hours, the $SO_2$ was turned off. The flux recovered over the next several hours to a value nearly equal to the value before the introduction of $SO_2$. The results of this experiment are given in FIGS. 1A and 1B, which show that 1 ppm sulfur dioxide in the feed gas quickly reduces the oxygen permeation rate by almost 60%.

Additional experimental studies were conducted to determine the reactivity of numerous ion-conducting metallic oxide membrane materials with sulfur dioxide. In these studies, air containing sulfur dioxide at various partial pressures was contacted with each material at different temperatures to determine the conditions at which sulfur dioxide reacted with the components of the membrane materials to form metal sulfates. It is believed that the formation of such metal sulfates reduces oxygen ion flux through the membrane material, which will reduce oxygen production in a membrane module which uses that membrane material.

Dense, sintered phase pure samples of multicomponent metal oxides of the compositions given in Table 1 were prepared by a standard solid state synthesis route. Stoichiometric amounts of lanthanum oxide, strontium carbonate, cobalt oxide, iron oxide and/or copper oxide were weighed out. The pure metal oxides and carbonates then were mixed by ball milling for 24 hrs. The mixed metal oxides were calcined at 1000–1100° C. for 24 hours in air. The multicomponent metal oxides then were ground by ball milling for 24 hours. The ground samples were calcined a second time at 1000–1100° C. for 24 hours in air followed by ball milling again. The powders were determined to be phase pure by x-ray diffraction and were mixed with a binder, plasticizer, and solvent to form a slip suitable for tape casting. The slip was tape cast to form a sheet. The solvent was evaporated. Disks were then cut from the sheet and sintered in air at temperatures of 1050° C.–1250° C. to form dense samples.

Samples of each composition were loaded into a retort and heated in air to the temperature given in Table 1. After reaching the desired temperature, $SO_2$ was blended with the air to achieve the desired $p_{SO2}$. Samples were then exposed to the air/$SO_2$ mixture for a period of up to 2 weeks. At the end of the exposure period, the samples were rapidly cooled to room temperature and removed from the retort.

The surfaces of the samples were then examined using scanning electron microscopy and electron dispersive spectroscopy to look for the presence of strontium sulfate. The surfaces of the unreacted samples contained no strontium sulfate, whereas the surfaces of the reacted samples did contain strontium sulfate.

The formation of these metal sulfates is undesirable because it causes decomposition of the membrane. Cations, for example Sr, must diffuse to the membrane surface to react with $SO_2$ from the gas phase. The formation of the strontium metal sulfates must be accompanied by the formation of other species, for example La and Co oxides. Upon reduction of $p_{SO2}$ below $p_{SO2}^*$, the strontium sulfate and the La and Co oxides may react to reform the original material. However, the membrane material so formed may be of lower quality than the original material in terms of microstructure, density, and strength, and cumulative membrane damage therefore may occur over time.

The results of these studies are summarized in Table 1 and illustrate the concept of $p_{SO2}^*$. It is seen, for example, that $p_{SO2}^*$ lies between $10^{-6}$ and $10^{-7}$ atma at 750° C. for material with sample codes A, B, C, D, and F. At 950° C., $p_{SO2}^*$ lies between $10^{-5}$ and $10^{-6}$ atma for material D and between $10^{-6}$ and $10^{-7}$ atma for material E. Additional experiments at smaller partial pressure intervals can be carried out to further define the value of $p_{SO2}^*$ as necessary.

TABLE 1

Summary of Sulfur Dioxide Reaction Data.

| Material Composition | Sample Code | Temperature (° C.) | | | | |
|---|---|---|---|---|---|---|
| | | 750 | | 950 | | |
| | | Sulfur Dioxide Partial Pressure, $P_{SO2}$ (atma) | | | | |
| | | $10^{-6}$ | $10^{-7}$ | $10^{-5}$ | $10^{-6}$ | $10^{-7}$ |
| $La_{0.6}Sr_{0.4}Co_{0.8}Cu_{0.2}O_x$ | A | R | U | | | R |
| $La_{0.4}Sr_{0.6}Fe_{0.8}Cu_{0.2}O_x$ | B | R | U | | | R |
| $La_{0.4}Sr_{0.6}Co_{0.8}Cu_{0.2}O_x$ | C | R | U | | | |
| $La_{0.2}Sr_{0.8}FeO_x$ | D | R | U | R | U | U |
| $La_{0.8}Sr_{0.2}CoO_x$ | E | U | U | | R | U |
| $La_{0.6}Sr_{0.4}CoO_x$ | F | R | U | U | U | |

Key:
R = reacted with sulfur dioxide
U = unreacted with sulfur dioxide

Other ion-conducting metallic oxide materials may exhibit sulfur dioxide reactivity characteristics similar to those for the materials of Table 1, and the present invention may be applied to these materials. These may include, for example, materials of the general formula $(Ln_{1-x}A_x)_w(B_{1-y}B'_y)O_{3-d}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Cr, Mn, Fe, Co, Ni, Cu, Al, Zr and Ga; wherein $0 \leq x \leq 1$, $0 \leq y \leq 1$, and $0.95 < w < 1.05$; and wherein d is a number that renders the compound charge neutral. Other ion-conducting metallic oxide materials which can be used in the present invention include materials of the formula $Sr_\alpha(Fe_{1-x}Co_x)O_{\alpha+\beta}O_\delta$ where $0.01 < x < 1$, $1 < \alpha < 4$, $1 < \beta < 4$, $1 < (\alpha+\beta)/\alpha \leq 4$ and $\delta$ is a number that renders the compound charge neutral.

By knowing the actual value of $p_{SO2}^*$, or a range of sulfur dioxide partial pressures in which it lies, the required level of sulfur dioxide in the oxygen-containing gas in contact with an ion-conducting metallic oxide membrane can be defined. As an example of the utility of $p_{SO2}^*$, it is seen in Table 1 that material D at 750° C. reacts with sulfur dioxide at a sulfur dioxide partial pressure of $10^{-6}$ atma but does not react at $10^{-7}$ atma. This means that the partial pressure of sulfur dioxide in the oxygen-containing gas contacting this membrane material within the membrane module should be no greater than $10^{-7}$ atma.

As oxygen-containing feed gas flows through a membrane module from inlet to outlet, the actual sulfur dioxide partial pressure increases because oxygen is removed from the flowing oxygen-containing gas. The critical sulfur dioxide partial pressure, $p_{SO2}^*$, therefore must be applied at the membrane outlet conditions for the purpose of determining the maximum allowable sulfur dioxide partial pressure at the membrane module inlet. The partial pressures of sulfur dioxide at the membrane module inlet and outlet are related by the expression $$p_{SO2(mi)} = p_{SO2(mo)}(1-F_{O2}) \qquad \text{(Eq. 1)}$$

where $p_{SO2(mi)}$ and $p_{SO2(mo)}$ are the sulfur dioxide partial pressures at the membrane module inlet and outlet, respectively, and $F_{O2}$ is the volume or molar fraction of the inlet air or oxygen-containing gas to the module which is removed as oxygen by permeation through the membrane. For example, if the inlet gas is air and 50% of the oxygen (approximately 10% of the inlet air) is removed by permeation, $F_{O2}$ is about 0.1.

In order to ensure that sulfur dioxide does not react with the membrane material anywhere in the module, the sulfur dioxide partial pressure at the membrane module outlet must be less than the critical sulfur dioxide partial pressure, i.e., $$p_{SO2(mo)} < p_{SO2}^* \qquad \text{(Eq. 2)}$$

The inlet sulfur dioxide partial pressure therefore is related to the critical sulfur dioxide partial pressure by the expression $$p_{SO2(mi)} < [p_{SO2}^*(1-F_{O2})] \qquad \text{(Eq. 3)}$$

As described below, an oxygen recovery process should be designed such that the membrane feed meets the criterion of Eq. 3. Obviously, the greater the $p_{SO2}^*$, the more flexibility exists for the design of the process and possible sulfur dioxide removal systems.

Figure 2:
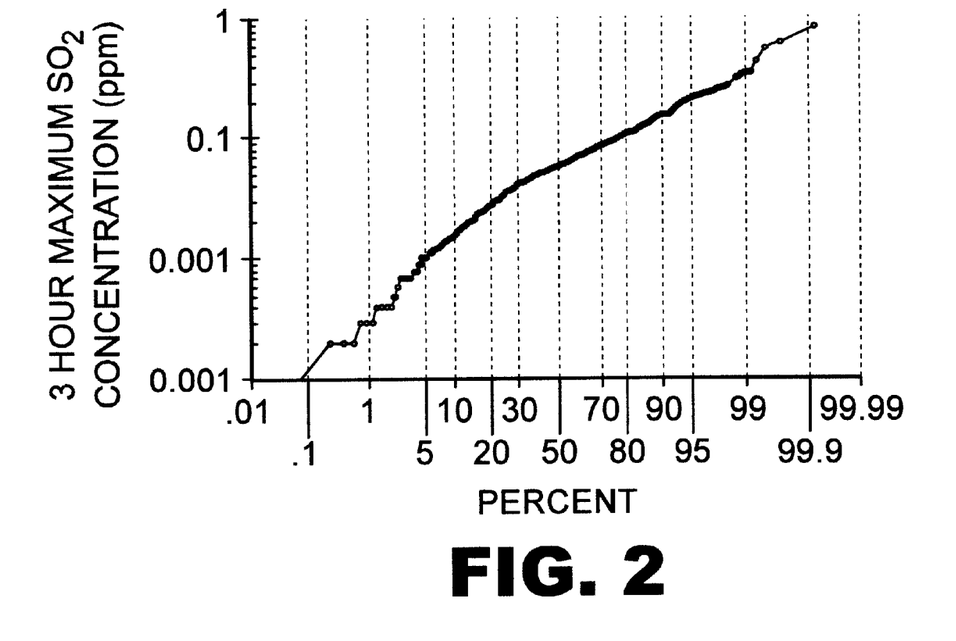
FIG. 2 is a frequency plot of the three-hour maximum time-weighted average sulfur dioxide concentration in the ambient air at locations in the United States for the year 2000.

Ambient air contains sulfur dioxide at varying concentrations which depend on location, time of day, weather conditions, and season. The EPA continuously monitors sulfur dioxide concentrations at numerous locations in the United States, analyzes the data, and publishes this information in various formats averaged over different time intervals. For the year 2000, the distribution of maximum annual, three-hour, average sulfur dioxide concentrations as reported by the EPA is shown in FIG. 2. This plot indicates, for example, that the maximum annual, three-hour, average sulfur dioxide concentration is greater than 0.1 parts per million by volume (ppmv) (equivalent to a partial pressure of $10^{-7}$ atma) for 20% of the locations tested. Similar data reported by the EPA averaged over 24 hours indicates, for example, that the annual maximum 24-hour average sulfur dioxide concentration is above 0.05 ppm (equivalent to a partial pressure of $0.5 \times 10^{-7}$ atma) for 10% of the locations tested. As described below, ambient air sulfur dioxide concentrations at these levels can have a significant impact on the operation of ion-conducting metallic oxide membrane systems.

Figure 3:
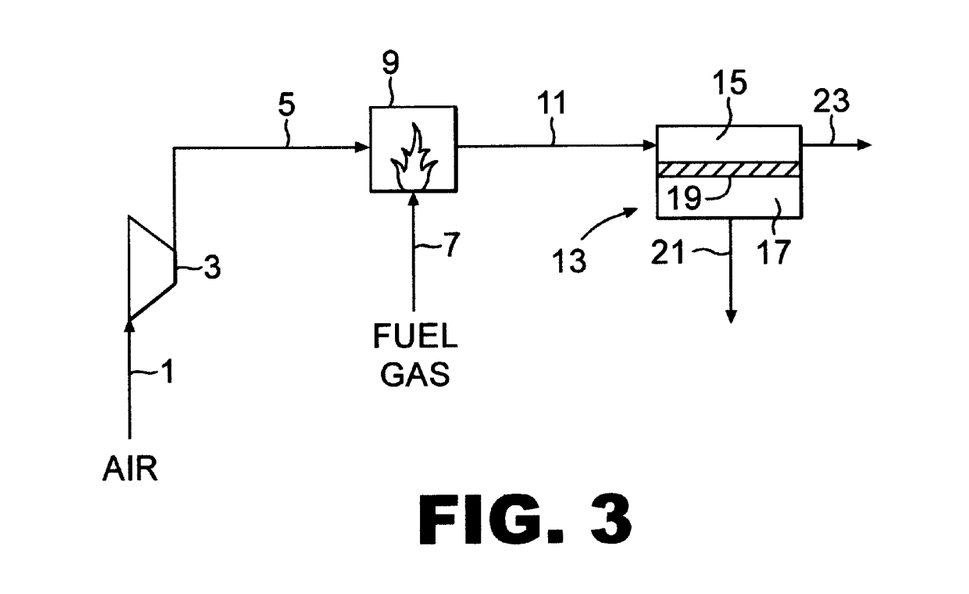
FIG. 3 is a schematic flow diagram of a gas-fired ion-conducting metallic oxide membrane system for the recovery of oxygen.

A schematic flow diagram of an ion-conducting metallic oxide membrane system is shown in FIG. 3. Atmospheric air in line 1 is compressed in compressor 3 to yield compressed air in line 5. While air is the typical feed gas, any oxygen-containing gas can be utilized as the feed gas to the process described below. The compressed air or oxygen-containing gas in line 5 is combusted with fuel from line 7 in combustor 9, and the resulting oxygen-containing combustion products in line 11 flow into membrane module 13. This module, shown in simplified form, comprises feed side 15 and permeate side 17 which are separated by ion-conducting membrane 19. As heated oxygen-containing gas flows from the inlet to the outlet of the feed side, oxygen ions are formed and permeate through the membrane to permeate side 17, where the permeated ions convert to gaseous oxygen which is withdrawn via line 21. Oxygen-depleted non-permeate gas is withdrawn via line 23.

The terms "compressed" or "pressurized" as used herein are interchangeable and refer to a gas stream which is at a pressure above atmospheric pressure.

One of the controllable parameters in this system is the pressure ratio (PR) of compressor 3, which is defined as the ratio of the absolute pressure of compressed gas in line 5 to the pressure of gas in line 1, which is typically at atmospheric pressure. This pressure ratio may range between about 5 and about 50, and in some embodiments may range between about 8 and about 30. Another controllable parameter is the air to fuel ratio (AFR) in combustor 9, which is defined as the ratio of the molar flow rate of air or oxygen-containing gas in line 5 to the molar flow rate of fuel in line 7. This air to fuel ratio may lie between about 12 and about 120. Both of these parameters have an important impact on the partial pressure of sulfur dioxide in the oxygen-containing gas flowing through feed side 15 of membrane module 13.

When the oxygen-containing gas in line 1 is atmospheric air, it typically will contain sulfur dioxide as discussed above. Oxygen-containing gas other than air also may contain sulfur dioxide. The fuel gas in line 7 typically includes sulfur-containing compounds which, when combusted in combustor 9, form additional sulfur dioxide. The partial pressure of sulfur dioxide in the oxygen-containing gas feed to membrane module 13 can be determined by material balance as a function of the sulfur dioxide concentration in the air or oxygen-containing gas in line 1, the equivalent sulfur dioxide concentration in fuel gas in line 7, the pressure ratio (PR) of compressor 3, and the air to fuel ratio (AFR) in combustor 9. When the total gas pressure and sulfur dioxide partial pressures are expressed in atmospheres absolute (atma), the partial pressure of sulfur dioxide in the oxygen-containing gas in line 11 at the inlet to membrane module 13 can be expressed as $$p_{SO2(mi)} = PR[Y_{SO2(a)} + Y_{SO2e(f)}/AFR][AFR/(AFR+1)] \tag{Eq. 4}$$

where $p_{SO2(mi)}$ is the partial pressure of sulfur dioxide in atma in the oxygen-containing gas in line 11 at the inlet of membrane module 13, PR is the pressure ratio of compressor 3, AFR is the air to fuel ratio of combustor 9, $y_{SO2(a)}$ is the mole fraction of sulfur dioxide in the atmospheric air or other oxygen-containing gas in line 1, and $y_{SO2e(f)}$ is the equivalent sulfur dioxide concentration in the fuel gas in line 11 assuming that all sulfur species (hydrogen sulfide, carbonyl sulfide, mercaptans, and the like) are combusted to sulfur dioxide in combustor 9.

When the value of AFR is large, the factor [AFR/(AFR+1)] in Eq. 4 is close to unity and the simplified equation 4a below can be used as an approximation of Eq. 4.

$$p_{SO2(mi)} = PR[y_{SO2(a)} + y_{SO2e(f)}/AFR] \tag{Eq. 4a}$$

The concentration of sulfur dioxide in atmospheric air typically is expressed as parts per billion (ppb) by volume and the equivalent sulfur dioxide concentration of fuel gas typically is expressed as parts per million (ppm) by volume. When the concentrations $y_{SO2(a)}$ and $y_{SO2e(f)}$ are expressed in these units, Eq. 4a becomes $$p_{SO2(mi)} = PR[10^{-9}Y_{SO2(a)} + 10^{-6}Y_{SO2e(f)}/AFR] \tag{Eq. 5}$$

where $Y_{SO2(a)}$ is the concentration of sulfur dioxide expressed as parts per billion by volume (ppb) in the air and $Y_{SO2e(f)}$ is the equivalent concentration of sulfur dioxide expressed as parts per million by volume (ppm) in the fuel gas. The partial pressure of sulfur dioxide in the oxygen-containing gas at the outlet of feed side 15 of membrane module 13 can be expressed, using Eq. 1 and Eq. 5, as $$p_{SO2(mo)} = PR[10^{-9}Y_{SO2(a)} + 10^{-6}Y_{SO2e(f)}/AFR][1-F_{O2}] \tag{Eq. 6}$$

where, as above, $F_{O2}$ is the volume or molar fraction of the inlet oxygen-containing gas to membrane module 13 which is removed as oxygen via line 21 by permeation through membrane 19. Eq. 2 and Eq. 6 can be combined to yield $$p_{SO2}^* > PR[10^{-9}Y_{SO2(a)} + 10^{-6}Y_{SO2e(f)}/AFR]/[1-F_{O2}] \tag{Eq. 7}$$

This expression defines the desired operating criterion for membrane module 13. It is seen that the pressure ratio, PR, and the air to fuel ratio, AFR, can have a significant effect on this operating criterion. Eq. 7 allows the process designer to determine whether treatment of the air or fuel to remove sulfur-containing species is necessary to meet the critical sulfur dioxide partial pressure of a membrane material. If treatment is required, the relationship among the process variables in Eq. 7 enables the designer to select the most cost-effective treatment method or methods. In certain cases, Eq. 7 may indicate to the designer that no treatment is required, and this indication is considered to be within the scope of the present invention.

The operation of an ion-conducting metallic oxide membrane system at high temperatures may be integrated with a gas turbine to enhance the overall energy efficiency of oxygen recovery by expanding hot, oxygen-depleted, non-permeate gas from the membrane module through a gas turbine expander to recover useful work. The membrane module integration with a gas turbine system is illustrated in the exemplary process of FIG. 4. Atmospheric air or other oxygen-containing gas 101 optionally can be treated to remove sulfur dioxide in sulfur dioxide removal system 103 and flows via line 105 to compressor 107. Sulfur dioxide removal system 103 can utilize a getter process in which air is contacted with, for example, impregnated carbons, slurry-coated alumina pellets, or slurry-coated extruded alumina monoliths. The slurry used to coat the alumina may comprise materials such as CuO, CaO, or $Na_2CO_3$. The oxygen-containing gas may be compressed at a pressure ratio of between about 5 and about 50, and in some embodiments may range between about 8 and about 30, to yield a compressed oxygen-containing gas feed in line 109, a portion of which optionally is withdrawn in line 111 for use as described later.

Figure 4:
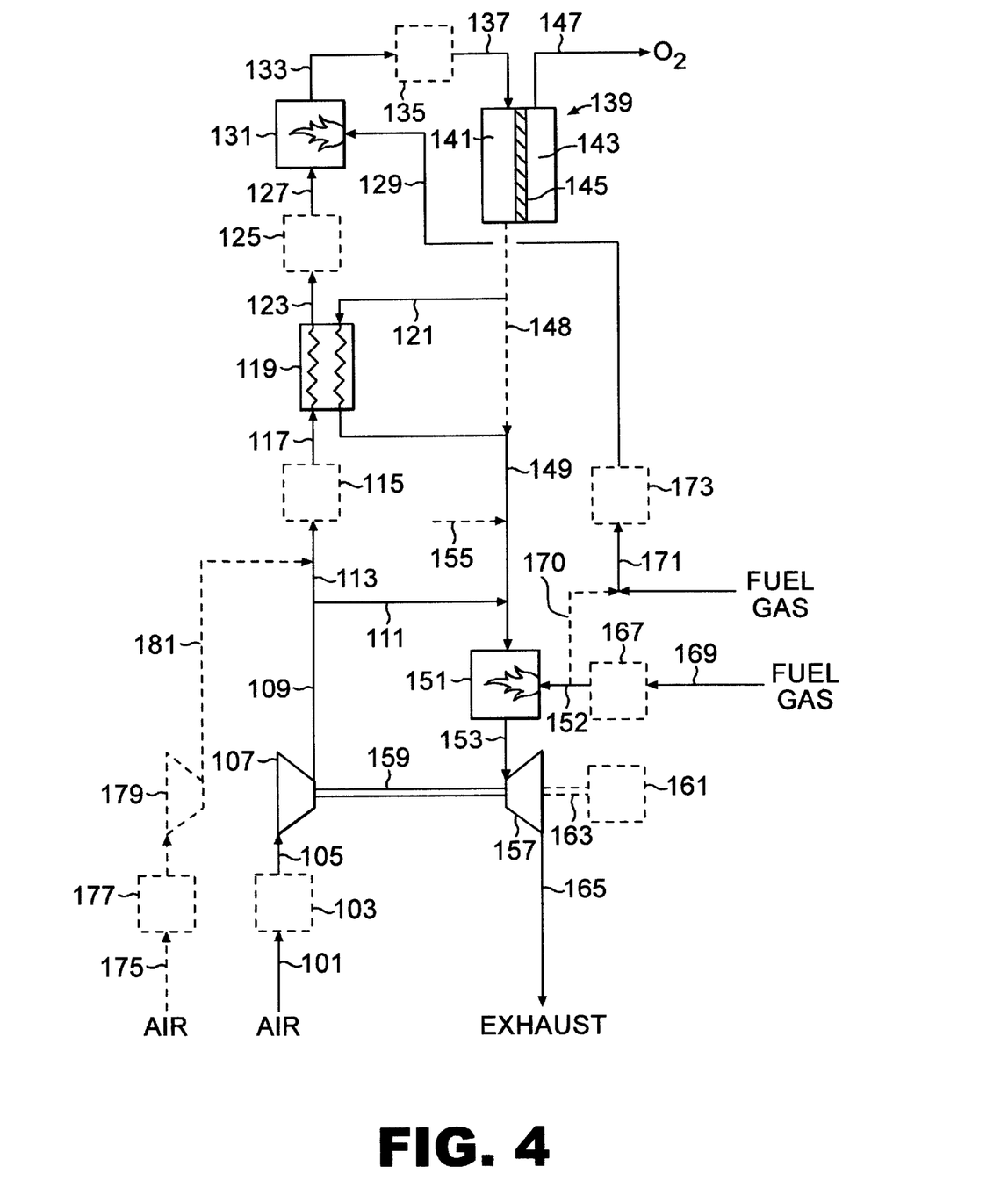
FIG. 4 is a schematic flow diagram of a gas-fired ion-conducting metallic oxide membrane system for the recovery of oxygen integrated with a gas turbine.

Compressed air or oxygen-containing gas in line 113 optionally can be treated to remove sulfur dioxide in sulfur dioxide removal system 115. Sulfur dioxide removal system 115 may be similar to system 103 described above. Compressed oxygen-containing gas in line 117 may be heated in heat exchanger 119 by indirect heat exchange with hot gas stream 121 (later defined), and the compressed gas in line 123 optionally can be treated to remove sulfur dioxide in sulfur dioxide removal system 125. Sulfur dioxide removal system 125 may be similar to system 103 described above. Alternatively, the compressed gas may be contacted with a solid ion-conducting material which has a value of $p_{SO2}^*$ which is less than the $p_{SO2}^*$ of the solid ion-conducting material in membrane 145.

Compressed air or oxygen-containing gas in line 127 may be heated by direct combustion with fuel gas from line 129 in combustor 131 to yield hot compressed oxygen-containing gas in line 133 at temperature in the range of 500° C. to 1000° C. Typically, the oxygen concentration in this hot oxygen-containing gas is in the range of 12 to 20 mole %. Optionally, sulfur dioxide may be removed from this hot oxygen-containing gas in sulfur dioxide removal system 135. Sulfur dioxide removal system 135 is similar to system 103 or the alternative to system 103 described above.

Alternatively, an indirect-fired heater or process furnace may be used in place of direct-fired combustor 131, in which case combustion products would not contact ion-conducting membrane 145.

Hot oxygen-containing gas then flows via line 137 to ion-conducting membrane module 139. This module, shown in simplified form, comprises feed side 141 and permeate side 143 which are separated by ion-conducting membrane 145. As heated oxygen-containing gas flows from the inlet to the outlet of the feed side of the membrane module, oxygen ions are formed and are transported through the membrane to permeate side 143, where the ions convert to gaseous oxygen which is withdrawn as a hot, high purity oxygen product via line 147. Typically, up to about 80% of the oxygen in the hot oxygen-containing gas in line 137 is recovered by permeation through membrane 145 to yield the oxygen product in line 147.

Hot, oxygen-depleted, non-permeate gas is withdrawn via line 121 and can be cooled in heat exchanger 119 by indirect heat exchange with compressed air in line 117 as earlier described. Optionally, the hot, oxygen-depleted, non-permeate gas is withdrawn via line 148 and heat exchanger 119 is not used. The hot, oxygen-depleted, non-permeate gas then flows via line 149 into combustor 151, where it is combusted with fuel gas from line 152. Optionally, water can be added via line 155 to the hot, oxygen-depleted, non-permeate gas in line 149 prior to combustor 151. Optionally, compressed air in line 111 can be combined with the hot, oxygen-depleted, non-permeate gas in line 149 prior to combustor 151.

Hot combustion gases from combustor 151 flow via line 153 to expansion turbine 157, which generates shaft work which may be used to drive compressor 107 via shaft 159 and/or optionally to drive electric generator 161 via shaft 163. Hot expansion turbine exhaust is withdrawn via line 165 and optionally can be used to generate steam (not shown). This steam can be used if desired to sweep (not shown) the permeate side of membrane module 139 and/or to generate additional shaft work via a steam turbine (not shown).

Alternatively, compressor 107 may be driven by a separate driver and the work output of expansion turbine 157 may be used for other purposes. For example, all work produced by expansion turbine 157 may be used to drive generator 161 to produce electric power.

Air or other oxygen-containing gas makeup to the integrated system described above may be provided if desired by additional atmospheric air or oxygen-containing gas via line 175, optional sulfur dioxide removal system 177, and compressor 179. Sulfur dioxide removal system 177 is similar to system 103 described earlier. Alternatively, sulfur dioxide may be removed (not shown) from compressed air or oxygen-containing gas in line 181. The compressed air or oxygen-containing gas in line 181 provides additional motive gas to expansion turbine 157 to compensate for gas removed as oxygen product via line 147. Alternatively, this function can be provided by water addition via line 155 earlier described.

Fuel gas 152 is provided from optional sulfur removal system 167, which removes sulfur-containing compounds such as hydrogen sulfide, carbonyl sulfide, mercaptans, and the like from fuel gas supplied via line 169. Sulfur removal system 167 may be any of the commercially-available gas sweetening technologies broadly characterized as chemically absorptive, such as monoethanolamine (MEA), methyldiethanolamine (MDEA), or activated MDEA. Alternatively, physically absorptive solvent-based processes such Selexol® or Rectisol® may be used. If desired, adsorptive processes with chemical adsorbents such as ZnO may be used.

A portion of the fuel gas in line 152 optionally can be withdrawn via lines 170 and 171 and treated in sulfur removal system 173 for further removal of sulfur-containing compounds to provide the fuel gas in line 129 to combustor 131. Sulfur removal system 173 may be any of the sulfur removal systems described above for system 167. Physically absorptive or adsorptive systems are particularly useful to obtain a tighter sulfur specification for the fuel gas to combustor 131. Alternatively, all fuel gas for burner 151 can be obtained by treating fuel gas from line 169 in sulfur removal system 167 and all fuel for burner 131 can be obtained by treating fuel gas from line 171 in sulfur removal system 173.

Ion-conducting membrane 145 in membrane module 139 is fabricated from high-temperature ceramic materials which include a selected ion-conducting metallic oxide material having appropriate oxygen ion permeability and acceptable resistance to damage by sulfur dioxide at the selected operating conditions. The ion-conducting metallic oxide material may be selected from materials of the general formula $(Ln_{1-x}A_x)_w(B_{1-y}B'_y)O_{3-d}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Cr, Mn, Fe, Co, Ni, Cu, Al, Zr and Ga; wherein $0 \leq x \leq 1$, $0 \leq y \leq 1$, and $0.95 < w < 1.05$; and wherein d is a number that renders the compound charge neutral. Other ion-conducting metallic oxide materials which may be used in the present invention include materials of the formula $Sr_\alpha(Fe_{1-x}Co_x)O_{\alpha+\beta}O_\delta$ where $0.01 < x < 1$, $1 < \alpha < 4$, $1 < \beta < 4$, $1 < (\alpha+\beta)/\alpha \leq 4$, and $\delta$ is a number that renders the compound charge neutral.

The integrated system of FIG. 4 is operated using the present invention to ensure that membrane 145 is not damaged by reaction with sulfur dioxide. The operating criterion described above in Eq. 7 is repeated below:

$$p_{SO2}^* > PR[10^{-9}Y_{SO2(a)}10^{-6}Y_{SO2e(f)}/AFR][1-F_{O2}] \quad \text{(Eq. 7)}$$

Figure 1B:
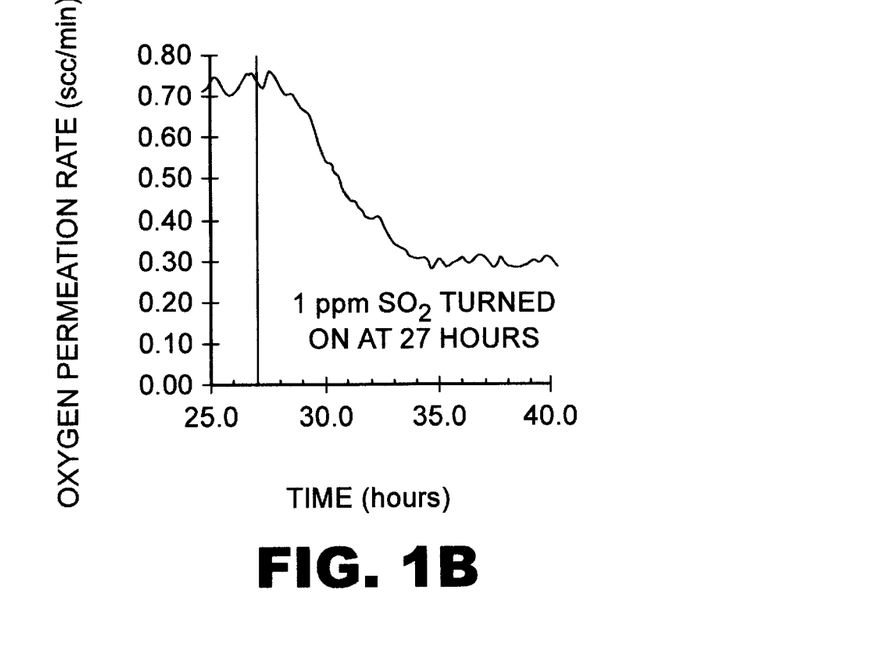
FIG. 1B is an expanded version of FIG. 1A for the time period of 25 to 40 hours.

This may be applied to the system of FIG. 4 in which PR is the pressure ratio of compressor 107, AFR is the air to fuel ratio of combustor 131, $Y_{SO2(a)}$ is the concentration in ppb of sulfur dioxide in the ambient air or oxygen-containing gas in line 101, $Y_{SO2e(f)}$ is the equivalent sulfur dioxide concentration in ppm in the fuel gas to combustor 131, $F_{O2}$ is the fraction of the inlet oxygen-containing gas to membrane module 139 which is removed as oxygen by permeation through membrane 145 and withdrawn via line 147, and $p_{SO2}^*$ is the critical sulfur dioxide partial pressure of the ion-conducting material in membrane 145. When ambient air is the oxygen-containing gas, the maximum annual, 3-hour average is particularly useful for the value of $Y_{SO2(a)}$, since the ion-conducting membrane material is adversely affected within three hours after the sudden presence of sulfur dioxide in the air feed as shown in FIG. 1B.

If fuel gas 129 is sulfur-free, there will be no contribution of sulfur dioxide to stream 133. Also, if combustor 131 is indirectly fired, there will be no contribution of sulfur dioxide to stream 133 from the fuel gas consumed in combustor 131.

The control criteria of Eq. 7 can be met by the removal of sulfur species in one or more of systems 103, 115, 125, 135, 167, 173, and 177 in FIG. 4 described above. The choice of system or systems and the required efficiency of each system will depend on the values of the parameters in Eq. 7, as well as the cost effectiveness and operating characteristics of the systems at the temperature and pressure of interest.

The fuel stream in line 169 may require sulfur removal to meet the sulfur emission specification for exhaust stream 165 from expansion turbine 157. For example, this sulfur specification is typically 50 ppm in an integrated gasification combined cycle application. Only the fraction of the fuel stream burned in combustor 131 requires final sulfur removal to meet the criterion of Eq. 7 for the material in membrane 145, and this is likely to be in the range of 0.1–5 ppm in the fuel gas to combustor 131 depending on the air-fuel ratio. For example, using pipeline natural gas for the fuel gas in line 169 might not require any sulfur removal, since a typical pipeline specification is 4 ppm sulfur or less and the air-fuel ratio for natural gas combustion will be at the upper end of the typical range for this ratio. If synthesis gas is used for the fuel in line 169, the sulfur removal could be accomplished by a well-known, cost-effective process such as methyl diethanolamine (MDEA) in system 167. This minimizes concurrent removal of carbon dioxide, which is advantageous when the fuel is burned and expanded in expansion turbine 157, since carbon dioxide remains in the mass flow to the turbine and thus contributes to the power output of the turbine. The final cleanup of the fuel to the combustor 131 in system 173 can be accomplished by the most cost-effective technology capable of achieving the required sulfur specification, for example, the Selexol® process.

The use of two separate sulfur removal processes for fuel gas to combustor 151 and fuel gas to combustor 131 may be less cost-effective than the use of a single, solvent-based process such as Selexol® to remove sulfur from the fuel stream in line 169 to meet the specifications required both by expansion turbine 157 and by the ion-conducting material in membrane 145. This could be accomplished by withdrawing partially-treated fuel gas for combustor 151 as a side stream from the contacting column and further contacting the fuel gas with additional solvent in additional column sections to yield a fuel gas with the lower sulfur content required by combustor 131. This option allows the polishing column sections and associated equipment to be downsized, which saves capital expense. When the sulfur specification in the fuel gas to combustor 131 is at least 1 ppm, Selexol® would be preferred to the Rectisol® process for the advantages of cost-effectiveness and substantial carbon dioxide slip to expansion turbine 157.

If trace sulfur in the air or oxygen-containing gas in line 101 must be removed prior to membrane module 139, this may be accomplished by one or more of the systems 103, 115, 125, 135, or 177, and this may obviate the need for extensive sulfur removal from the fuel gas in lines 169 or 171. Potentially viable technologies for use in systems 103, 115, 125, 135, or 177 fall into three broad categories: getter systems, continuous processes, and regenerative systems. The latter spans the former two; for example, a continuous process may involve several beds that are alternately regenerated, or a getter system may be regenerated off-line after a specified period. Potential getter systems include impregnated carbons, slurry-coated ceramic pellets, and slurry-coated extruded ceramic monoliths (e.g. CuO on alumina). Continuous systems comprise numerous technologies used for flue gas desulfurization (FGD), which typically reduce stack emissions from 1000–2000 ppm to approximately 100 ppm. Because the inlet and outlet sulfur concentrations in FGD systems are approximately three orders of magnitude greater than the sulfur contents anticipated here, these technologies are not well-suited for the process of FIG. 4.

A getter system can be an effective process for use in any of systems 103, 115, 125, 135, and 177. A getter system may be sized for application to air purification at a given site, for example, by using the annual maximum 3-hour time-weighted average concentration of sulfur dioxide in the ambient air to design the getter bed to meet the required effluent gas sulfur concentration. The getter bed may utilize, for example, impregnated carbons, alumina pellets, or extruded alumina monoliths slurry-coated with materials such as CuO, CaO, or $Na_2CO_3$. The annual average sulfur dioxide concentration at the plant location can be used to size the getter bed capacity. A reasonably-sized getter system with minimal pressure drop can be designed using this approach. For example, designing for the $99^{th}$ percentile of ambient air sulfur dioxide concentrations and a 10 ppb getter outlet concentration for a 500 ton/day oxygen membrane production process at 50% oxygen recovery, system 115 would require a getter bed 4.5 ft in diameter and 12 ft long with a pressure drop <1.5 psi. Assuming rapid surface reaction kinetics, such a bed would provide one year's capacity while also protecting against the annual maximum 3-hour time-weighted average sulfur dioxide concentration in the ambient air.

The preferred choice of sulfur removal processes depends on several design factors: (1) the $p_{SO2}^*$ of the membrane material; (2) the ambient sulfur dioxide concentration, $Y_{SO2(a)}$, which is dependent on the installation site or source of the oxygen-containing gas; (3) the operating pressure, which is process dependent (e.g. depends on the selection of integrated expansion turbine 157 and compressor 107); (4) the molar air to fuel ratio, AFR, in combustor 131, which depends on fuel selection and the degree of recuperative heating in exchanger 119, and which determines the relative sulfur contributions from the ambient air or other oxygen-containing gas and from the fuel; and (5) the equivalent sulfur dioxide concentration in the fuel gas, $Y_{SO2e(f)}$. A feature of the present invention is to employ only those processes necessary to maintain the membrane outlet sulfur dioxide partial pressure, $p_{SO2(mo)}$, below $p_{SO2}*$ of the membrane material, recognizing that superior membrane materials with higher values of $p_{SO2}*$ can dramatically increase the flexibility of the overall system design. Since $p_{SO2}*$ may be lower at temperatures below the steady-state membrane operating temperature, the overall sulfur removal system must be specified with startup, shutdown, and off-design considerations in mind.

If possible, the first preference is to treat only the fuel by the following method: (1) determine the sulfur dioxide contribution from ambient air or oxygen-containing gas, i.e., $p_{SO2(a)}$; if this is less than $p_{SO2}*$, then the difference sets the sulfur specification for the fuel to combustor 131; and (2) choose the most economic sulfur-removal system that can meet this specification, factoring in other considerations such as degree of $CO_2$ removal. Most preferably, the cost of the sulfur removal process may be minimized by treating only the fuel to combustor 131 to meet $p_{SO2}*$ determined above, recognizing that the use of recuperative heat exchanger 119 can further reduce the fuel requirement in combustor 131.

For some combinations of the critical design factors listed above, air treatment may be required for sulfur dioxide removal. In these situations, trace sulfur dioxide removal can be accomplished cost-effectively by utilizing a getter process for one or more of systems 103, 115, 125, 135, and 177 in FIG. 4. If air cleanup is required, the getter performance may remove substantially all of the sulfur from the air, which would then relax the sulfur specification for the fuel to combustor 131.

The following Examples illustrate the present invention but do not limit the invention to any of the specific details described therein.

EXAMPLE 1

The system of FIG. 4 is operated at a location which has an annual maximum 3-hour time-weighted average sulfur dioxide concentration of 300 parts per billion by volume (ppb). Compressor 107 compresses air supplied via line 101 and 105 to 20 atma. Combustor 131 combusts the compressed air with natural gas supplied via line 129 containing 3 ppm sulfur (expressed as sulfur dioxide equivalent) at an air to fuel ratio (AFR) of 60:1. The fraction of the oxygen-containing gas in line 137 to membrane module 139 which is removed as oxygen by permeation through membrane 145, $F_{O2}$, is 0.1. The critical sulfur dioxide concentration, $p_{SO2}*$, for the material used in membrane 145 is $5 \times 10^{-6}$ atma. From Eq. 6 it is determined that the sulfur dioxide partial pressure at the outlet of membrane module 139 is $7.8 \times 10^{-6}$ atma, 86% of which is contributed by sulfur dioxide in the air feed to compressor 107. It is seen that the critical sulfur dioxide concentration at the membrane module outlet, $p_{SO2}*$, is exceeded by the calculated value at that location, $p_{SO2(mo)}$. Therefore, in order to meet the critical sulfur dioxide partial pressure at the membrane outlet, sulfur dioxide is removed from the feed air in getter system 103 to a concentration of 175 ppb or less. Alternatively, the process of FIG. 4 could be operated in a satisfactory manner if the sulfur dioxide concentration in the ambient air were 175 ppb or less.

EXAMPLE 2

The system of FIG. 4 is operated at a location which has an annual maximum 3-hour time-weighted average sulfur dioxide concentration of 100 parts per billion by volume (ppb). Compressor 107 compresses air supplied via line 101 and 105 to 20 atma. Combustor 131 combusts the compressed air with synthesis gas supplied via line 129 at an air to fuel ratio (AFR) of 20:1. The fraction of the oxygen-containing gas in line 137 to membrane module 139 which is removed as oxygen by permeation through membrane 145, $F_{O2}$, is 0.1. The critical sulfur dioxide concentration, $p_{SO2}*$, for the material used in membrane 145 is $5 \times 10^{-6}$ atma. From Eq. 7 it is determined that the sulfur content of the fuel to combustor 131 must not exceed 2.5 ppm. This sulfur content can be readily achieved by using available acid gas removal technology in system 173 of FIG. 4.

EXAMPLE 3

The $p_{SO2}*$ for the material used in membrane 145 is $2.5 \times 10^{-6}$ atma and the other parameters are the same as in Example 2. From Eq. 7 it is determined that the sulfur concentration of the fuel gas to combustor 131 must not exceed 0.25 ppm. This rather stringent requirement would require use of an efficient sulfur removal process such as the Rectisol® process in system 167 of FIG. 4. This would have the disadvantage, however, of removing significant amounts of carbon dioxide from the synthesis gas fuel, thereby reducing the available mass flow to expansion turbine 157. Alternatively, sulfur could be removed to a level required by expansion turbine 157 in sulfur removal system 167 (typically to a specification of 50 ppm) and further sulfur removal could be effected in system 173 only for that portion of gas provided via line 129 to combustor 131.

EXAMPLE 4

The $p_{SO2}*$ for the material used in membrane 145 is $1.0 \times 10^{-6}$ atma and the other parameters are the same as in Example 2. In this case, the concentration of sulfur dioxide in the ambient air must not exceed 45 ppb even if the fuel to combustor 131 contains no sulfur (or if no direct-fired heating is used), otherwise sulfur dioxide removal from the feed air would be required. If a getter system is used upstream of combustor 131 and removes sulfur dioxide down to 1 ppb, the fuel to combustor 131 still must not exceed 0.88 ppm sulfur expressed as sulfur dioxide-a stringent requirement. This Example illustrates the importance of using membrane materials with higher levels of $p_{SO2}*$.

Thus the present invention offers a strategy for selecting effective methods to control the sulfur dioxide concentration at acceptable levels in the heated feed to ion-conducting metallic oxide membrane systems. It is disclosed that ion-conducting metallic oxide membrane materials exhibit a threshold level of the sulfur dioxide partial pressure, defined as the critical sulfur dioxide partial pressure, $p_{SO2}*$, above which sulfur dioxide reacts with the ion-conducting membrane material to reduce the oxygen flux through the membrane material and below which sulfur dioxide does not react with the ion-conducting membrane material to reduce the oxygen flux through the membrane material. Knowledge of this parameter with the computation methods described herein allow the specification of cost-effective sulfur control methods for ion-conducting membrane system design and operation.

As shown in the Examples, the contribution of sulfur dioxide from ambient air in the feed to a membrane module can be significant, and removal may be required even if sulfur-free fuel gas is used in a combustor upstream of the membrane module. Preferred sulfur control strategies can be developed using the methods described herein to address various sulfur dioxide levels in the ambient air and sulfur levels in the fuel gas.

What is claimed is:

1. A method for the operation of an ion-conducting membrane system including at least one ion-conducting metallic oxide membrane which divides the system into a feed side and a permeate side, each side having an inlet and an outlet, which method comprises providing a pressurized, heated, oxygen-containing gas mixture which also contains sulfur dioxide, introducing the compressed, heated, oxygen-containing gas mixture into the feed side of the membrane system, transporting oxygen ions through the ion-conducting membrane, withdrawing a hot, oxygen-depleted, non-permeate gas from the outlet of the feed side, and maintaining the sulfur dioxide partial pressure in the hot, oxygen-depleted, non-permeate gas mixture at the outlet of the feed side of the zone at a value below a critical sulfur dioxide partial pressure, $p_{SO2}*$, which is defined as the sulfur dioxide partial pressure above which sulfur dioxide reacts with the ion-conducting metallic oxide membrane to reduce oxygen flux through the membrane material and below which sulfur dioxide does not react with the ion-conducting metallic oxide membrane to reduce oxygen flux through the membrane material, wherein $p_{SO2}*$ is defined at the temperature of the hot, oxygen-depleted, non-permeate gas at the outlet of the feed side of the zone.

2. The method of claim 1 wherein the oxygen-containing gas mixture is atmospheric air.

3. The method of claim 2 wherein the sulfur dioxide partial pressure in the atmospheric air is defined as the annual maximum, three-hour, time-weighted average sulfur dioxide partial pressure.

4. The method of claim 1 wherein the ion-conducting membrane contains a multicomponent metallic oxide which comprises strontium.

5. The method of claim 1 wherein the ion-conducting membrane comprises a multicomponent metal oxide of the general formula $(Ln_{1-x}A_x)_w(B_{1-y}B'_y)O_{3-d}$, wherein Ln represents one or more elements selected from the group consisting of La, the D block lanthanides of the IUPAC periodic table, and Y; wherein A represents one or more elements selected from the group consisting of Mg, Ca, Sr and Ba; wherein B and B' each represent one or more elements selected from the group consisting of Sc, Ti, V, Cr, Mn, Fe, Co, Ni, Cu, Al, Zr and Ga; wherein $0 \leq x \leq 1$, $0 \leq y \leq 1$, and $0.95 < w < 1.05$; and wherein d is a number that renders the compound charge neutral.

6. The method of claim 5 wherein the membrane system is operated at an average temperature between about 750° C. and about 950° C.

7. The method of claim 6 wherein the value of $p_{SO2}*$ is in the range of about $10^{-4}$ to about $10^{-7}$ atma.

8. A method for the recovery of oxygen from an oxygen-containing gas mixture which also contains sulfur dioxide, which method comprises:

(a) compressing the oxygen-containing gas mixture to provide a compressed, oxygen-containing gas;

(b) heating at least a portion of the compressed, oxygen-containing gas to provide a heated and compressed oxygen-containing gas;

(c) introducing the heated and compressed oxygen-containing gas into a membrane separation zone comprising at least one ion-conducting membrane which divides the zone into a feed side and a permeate side, each side having an inlet and an outlet, withdrawing a hot, oxygen-depleted, non-permeate gas from the outlet of the feed side of the zone, and withdrawing an oxygen permeate product from the permeate side of the zone; and (d) maintaining the sulfur dioxide partial pressure in the hot, oxygen-depleted, non-permeate gas at the outlet of the feed side at a value below a critical sulfur dioxide partial pressure, $p_{SO2}*$;

wherein $p_{SO2}*$ is defined as the sulfur dioxide partial pressure above which sulfur dioxide reacts with the at least one ion-conducting membrane to reduce oxygen flux through the membrane material and below which sulfur dioxide does not react with the at least one ion-conducting membrane to reduce oxygen flux through the membrane material, and wherein $p_{SO2}*$ is defined at the temperature of the hot, oxygen-depleted, non-permeate gas mixture at the outlet of the feed side.

9. The method of claim 8 wherein the heating of at least a portion of the compressed, oxygen-containing gas is effected by combustion of the compressed, oxygen-containing gas with a fuel gas in a direct-fired burner such that the combustion products from the burner provide the heated and compressed oxygen-containing gas, and wherein one or more sulfur-containing compounds are removed from one or more gas streams selected from the group consisting of the oxygen-containing gas mixture, the compressed oxygen-containing gas, the heated and compressed oxygen-containing gas, and the fuel gas.

10. The method of claim 9 wherein $$p_{SO2}* > PR[10^{-9}Y_{SO2(a)} + 10^{-6}Y_{SO2e(f)}/AFR]/[1-F_{O2}]$$

where PR is the pressure ratio of the feed gas compressor, AFR is the air to fuel ratio in the direct-fired burner, $Y_{SO2(a)}$ is the concentration of sulfur dioxide expressed as parts per billion by volume (ppb) in the oxygen-containing gas mixture, $Y_{SO2e(f)}$ is the equivalent concentration of sulfur dioxide expressed as parts per million by volume (ppm) in the fuel gas, and $F_{O2}$ is the fraction of the oxygen-containing gas to the membrane separation zone that is removed as oxygen by permeation through the at least one ion-conducting membrane.

11. The method of claim 9 wherein the fuel gas contains one or more sulfur-containing compounds and at least a portion of the one or more sulfur-containing compounds are removed from the fuel gas prior to the direct-fired burner.

12. The method of claim 9 wherein the compressed, oxygen-containing gas is preheated by indirect heat exchange with the hot, oxygen-depleted, non-permeate gas prior to heating in the direct-fired burner.

13. The method of claim 12 wherein at least a portion of the sulfur dioxide is removed from the oxygen-containing gas prior to being preheated by indirect heat exchange with the hot, oxygen-depleted, non-permeate gas.

14. The method of claim 12 wherein at least a portion of the sulfur dioxide is removed from the oxygen-containing gas after being preheated by indirect heat exchange with the hot, oxygen-depleted, non-permeate gas.

15. The method of claim 14 wherein at least a portion of the sulfur dioxide is removed from the oxygen-containing gas after being preheated by indirect heat exchange with the hot, oxygen-depleted, non-permeate gas by contacting the oxygen-containing gas with a solid ion-conducting material which has a $p_{SO2}*$ that is less than the $p_{SO2}*$ of the oxygen-selective, ion-conducting membrane of (c).

16. The method of claim 9 wherein the oxygen-depleted, non-permeate gas is heated in a direct-fired combustor to provide a heated, oxygen-depleted, non-permeate gas, and wherein the heated, oxygen-depleted, non-permeate gas is expanded in an expansion turbine to generate shaft work.

17. The method of claim 16 wherein at least a portion of the sulfur dioxide is removed from the oxygen-containing gas after being preheated by indirect heat exchange with the hot, oxygen-depleted, non-permeate gas by contacting the oxygen-containing gas with a solid ion-conducting material which has a $p_{SO_2}*$ which is less than the $p_{SO_2}*$ of the oxygen-selective, ion-conducting membrane of (c).

18. The method of claim 17 wherein at least a portion of the shaft work is utilized to compress the oxygen-containing gas mixture of (a).

19. The method of claim 18 wherein a portion of the compressed, oxygen-containing gas is withdrawn and combined with the oxygen-depleted, non-permeate gas prior to the direct-fired combustor.

20. The method of claim 19 wherein a supplemental stream of an oxygen-containing gas mixture that also contains sulfur dioxide is compressed to yield a supplemental compressed oxygen-containing gas mixture which is added to the compressed oxygen-containing gas after withdrawal of the portion of the compressed, oxygen-containing gas.

21. The method of claim 20 wherein at least a portion of the sulfur dioxide is removed from the supplemental stream of the oxygen-containing gas mixture or the supplemental compressed oxygen-containing gas mixture.

22. The method of claim 16 wherein the direct-fired combustor utilizes a treated fuel gas obtained by removing one or more sulfur-containing compounds from a raw fuel gas.

23. The method of claim 22 wherein the fuel gas for the direct-fired burner is provided by further treating a portion of the treated fuel gas to remove additional sulfur-containing compounds therefrom.

24. The method of claim 8 wherein the oxygen-containing gas mixture is atmospheric air.

25. The method of claim 8 wherein the ion-conducting membrane contains a multicomponent metallic oxide which comprises strontium.

26. The method of claim 8 wherein at least a portion of the sulfur dioxide is removed from the oxygen-containing gas mixture.

27. The method of claim 8 wherein at least a portion of the sulfur dioxide is removed from the compressed, oxygen-containing gas.

28. The method of claim 8 wherein at least a portion of the sulfur dioxide is removed from the heated and compressed oxygen-containing gas.

* * * * *